United States Patent
Tian et al.

(10) Patent No.: US 10,573,017 B2
(45) Date of Patent: Feb. 25, 2020

(54) DEPTH ESTIMATION METHOD AND DEPTH ESTIMATION APPARATUS OF MULTI-VIEW IMAGES

(71) Applicant: Fujitsu Limited, Kawasaki-shi, Kanagawa (JP)

(72) Inventors: Hu Tian, Beijing (CN); Fei Li, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 189 days.

(21) Appl. No.: 15/858,084

(22) Filed: Dec. 29, 2017

(65) Prior Publication Data
US 2018/0247425 A1 Aug. 30, 2018

(30) Foreign Application Priority Data
Feb. 28, 2017 (CN) .......................... 2017 1 0111586

(51) Int. Cl.
*G06K 9/00* (2006.01)
*G06T 7/593* (2017.01)
*G06T 7/13* (2017.01)
*H04N 13/00* (2018.01)

(52) U.S. Cl.
CPC ............... *G06T 7/596* (2017.01); *G06T 7/13* (2017.01); *H04N 13/00* (2013.01); *G06T 2207/10028* (2013.01); *H04N 2013/0081* (2013.01)

(58) Field of Classification Search
CPC . G06T 7/596; G06T 7/13; G06T 2207/10028; H04N 13/00; H04N 2013/0081
See application file for complete search history.

(56) References Cited

U.S. PATENT DOCUMENTS

| | | | | |
|---|---|---|---|---|
| 8,933,925 | B2 * | 1/2015 | Sinha | G06T 15/00 345/419 |
| 2008/0247668 | A1 * | 10/2008 | Li | G06K 9/32 382/285 |
| 2012/0041722 | A1 * | 2/2012 | Quan | G06T 17/05 703/1 |

(Continued)

OTHER PUBLICATIONS

Extended European Search Report dated Mar. 8, 2018 in corresponding European Patent Application No. 17206969.2, 11 pages.

(Continued)

*Primary Examiner* — Samir A Ahmed
(74) *Attorney, Agent, or Firm* — Staas & Halsey LLP

(57) ABSTRACT

A depth estimation method and a depth estimation apparatus of multi-view images where the method includes: taking each image among a plurality of images in a same scenario as a current image to perform the processing of: obtaining an initial depth value of each pixel in the current image; dividing the current image into a plurality of superpixels; obtaining plane parameters of the plurality of superpixels according to a predetermined constraint condition based on the initial depth values; and generating a depth value of each pixel in the superpixels based on the plane parameters of the superpixels; wherein the predetermined constraint condition includes: a co-connection constraint, which is related to a difference between depth values of adjacent points on neighboring superpixels that do not occlude each other.

12 Claims, 3 Drawing Sheets

(56) References Cited

U.S. PATENT DOCUMENTS

| | | | | |
|---|---|---|---|---|
| 2012/0098932 A1* | 4/2012 | Kim | ................. | G06T 7/593 |
| | | | | 348/43 |
| 2014/0285486 A1* | 9/2014 | Chang | ................. | G06T 17/00 |
| | | | | 345/420 |
| 2014/0301633 A1* | 10/2014 | Furukawa | ............ | G06T 17/00 |
| | | | | 382/154 |
| 2015/0063681 A1* | 3/2015 | Bhardwaj | .......... | G06K 9/00208 |
| | | | | 382/154 |
| 2016/0335790 A1* | 11/2016 | Fleishman | ......... | G06K 9/00355 |

OTHER PUBLICATIONS

B. Micusik et al., "Piecewise Planar City 3D Modeling from Street View Panoramic Sequences", IEEE Computer Society Conference on Computer Vision and Pattern Recognition Proceedings, 2009 IEEE, Jun. 1, 2009, pp. 2906-2912.

D. Gallup et al., "Real-Time Plane-Sweeping Stereo with Multiple Sweeping Directions", IEEE Conference on Computer Vision and Pattern Recognition, Jun. 1, 2007, 8 pages.

B. Micusik et al., "Multi-view Superpixel Stereo in Man-made Environments", Technical Report Series, Technical Report GMU-CS-TR-2008-1, Jan. 1, 2008, pp. 1-12.

A. Saxena et al., "3-D Reconstruction from Sparse Views using Monocular Vision", IEEE 11$^{th}$ International Conference on Computer Vision, 2007 IEEE, Oct. 1, 2007, 8 pages.

\* cited by examiner

DEPTH ESTIMATION METHOD AND DEPTH ESTIMATION APPARATUS OF MULTI-VIEW IMAGES

CROSS-REFERENCE TO RELATED APPLICATIONS

This application claims priority to Chinese Patent Application No. 201710111586.2, filed on Feb. 28, 2017 and entitled "DEPTH ESTIMATION METHOD AND DEPTH ESTIMATION APPARATUS OF MULTI-VIEW IMAGES", contents of which are incorporated herein by reference in its entirety.

BACKGROUND

1. Field

The present disclosure relates generally to the field of image processing technology. Particularly, the present disclosure relates to a method and an apparatus capable of accurately estimating a depth of a multi-view image.

2. Description of the Related Art

In recent years, computer vision technology has gained rapid development and wide application, such as entertainment, virtual reality, robots and so on, wherein multi-view stereo (MVS) reconstruction is basic and important, with its purpose being automatically acquiring a depth map of a three-dimensional object or scene from a plurality of calibrated images.

The conventional MVS reconstruction algorithm calculates a depth map for each calibrated image. For example, local and global relations of each pixel are constructed using Markov random field. However, the conventional method often causes erroneous estimation of depths of pixels in an occluded area and generation of an excessively smooth depth map.

Thus, the present disclosure aims to accurately estimate a depth of a multi-view image, so as to avoid erroneous estimation of depths of pixels in an occluded area and generation of an excessively smooth depth map.

SUMMARY

A brief summary of the present disclosure is given below to provide a basic understanding of some aspects of the present disclosure. It should be understood that the summary is not an exhaustive summary of the present disclosure; it does not intend to define a key or important part of the present disclosure, nor does it intend to limit the scope of the present disclosure. The object of the summary is only to briefly present some concepts, which serves as a preamble of the detailed description that follows.

An object of the present disclosure is to propose a method and an apparatus capable of accurately estimating a depth of a multi-view image.

To achieve the above object, according to one aspect of the present disclosure, there is provided a depth estimation method of multi-view images, the method comprising: taking each image among a plurality of images in a same scenario as a current image to perform the processing of: obtaining an initial depth value of each pixel in the current image; dividing the current image into a plurality of superpixels; obtaining plane parameters of the plurality of superpixels according to a predetermined constraint condition based on the initial depth values; and generating a depth value of each pixel in the superpixels based on the plane parameters of the superpixels; wherein the predetermined constraint condition includes: a co-connection constraint, which is related to a difference between depth values of adjacent points on neighboring superpixels that do not occlude each other.

According to another aspect of the present disclosure, there is provided a depth estimation apparatus of multi-view images, which performs operations by taking each image among a plurality of images in a same scenario as a current image, the depth estimation apparatus comprising: an obtaining device configured to: obtain an initial depth value of each pixel in the current image; a dividing device configured to: divide the current image into a plurality of superpixels; a parameter generating device configured to: obtain plane parameters of the plurality of superpixels according to a predetermined constraint condition based on the initial depth values; and a depth value generating device configured to: generate a depth value of each pixel in the superpixels based on the plane parameters of the superpixels; wherein the predetermined constraint condition includes: a co-connection constraint, which is related to a difference between depth values of adjacent points on neighboring superpixels that do not occlude each other.

In addition, according to another aspect of the present disclosure, there is further provided a storage medium. The storage medium comprises machine-readable program code that, when executed on an information processing apparatus, causes the information processing apparatus to perform the above method according to the present disclosure.

Besides, according to yet another aspect of the present disclosure, there is further provided a program product comprising machine-executable instructions that, when executed on an information processing apparatus, cause the information processing apparatus to perform the above method according to the present disclosure.

BRIEF DESCRIPTION OF THE DRAWINGS

The above and other objects, features and advantages of the present disclosure would be understood more easily with reference to embodiments of the present disclosure which are described in combination with the appended drawings below. Components in the appended drawings aim only to show the principle of the present disclosure. In the appended drawings, identical or similar technical features or components are denoted by same or similar reference signs. In the appended drawings.

DETAILED DESCRIPTION

Exemplary embodiments of the present disclosure will be described in detail combined with the appended drawings below. For the sake of clarity and conciseness, the specification does not describe all features of actual embodiments.

However, it should be understood that in developing any such actual embodiment, many decisions specific to the embodiments must be made, so as to achieve specific objects of a developer; for example, those limitation conditions related to the system and services are met, and these limitation conditions possibly would vary as embodiments are different. In addition, it should be appreciated that although developing tasks are possibly complicated and time-consuming, such developing tasks are only routine tasks for those skilled in the art benefiting from the contents of the disclosure.

It should also be noted herein that, to avoid the present disclosure from being obscured due to unnecessary details, only those device structures and/or processing steps closely related to the solution according to the present disclosure are shown in the appended drawings, while omitting other details not closely related to the present disclosure. In addition, it should also be noted that elements and features described in one figure or one embodiment of the present disclosure can be combined with elements and features shown in one or more other figures or embodiments.

The basic concept of the present disclosure is to introduce, based on the concept of superpixels, plane parameters in place of depths to calculate depth values from the plane parameters. In this process, four constraint conditions are introduced.

A flowchart of a depth estimation method of multi-view images according to an embodiment of the present disclosure will be described below with reference to FIG. 1.

Figure 1:
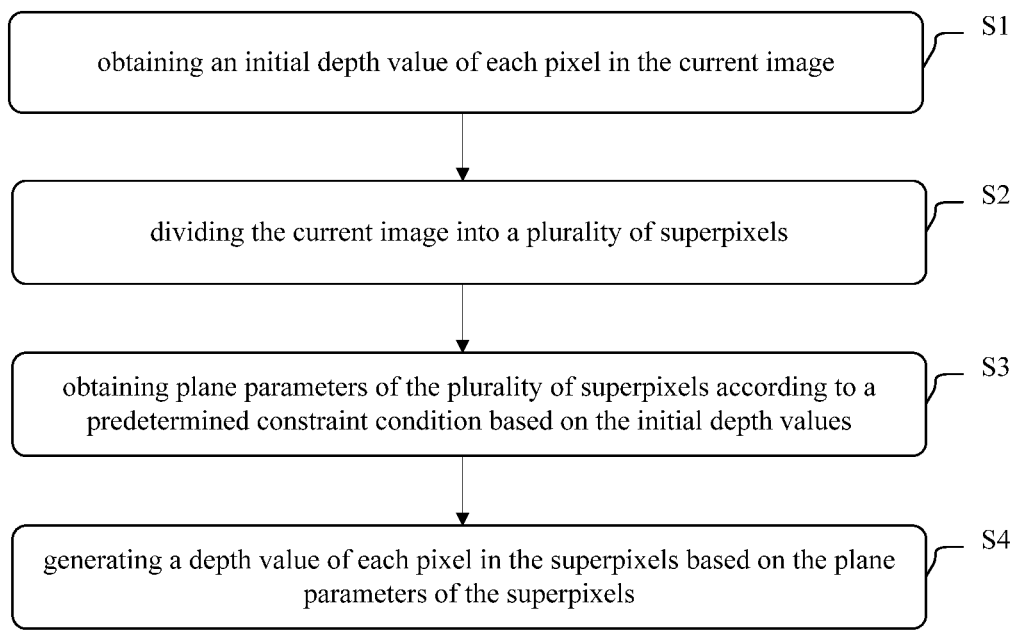
FIG. 1 shows a flowchart of a depth estimation method of multi-view images according to an embodiment of the present disclosure.

FIG. 1 shows a flowchart of a depth estimation method of multi-view images according to an embodiment of the present disclosure. As shown in FIG. 1, the method takes each image among a plurality of images in a same scenario as a current image to perform the processing of: obtaining an initial depth value of each pixel in the current image (step S1); dividing the current image into a plurality of superpixels (step S2); obtaining plane parameters of the plurality of superpixels according to a predetermined constraint condition based on the initial depth values (step S3); and generating a depth value of each pixel in the superpixels based on the plane parameters of the superpixels (step S4).

Each image among a plurality of images in a same scenario will be taken as a current image to perform processing. Other images among the plurality of images may be taken as reference images.

In step S1, an initial depth value of each pixel in the current image is obtained.

That is, step S1 is a step of obtaining initial values of depth values. Obviously, this step can utilize any method capable of obtaining depth values in the prior art.

An exemplary method of acquiring an initial depth value is given below with reference to FIG. 2.

Figure 2:
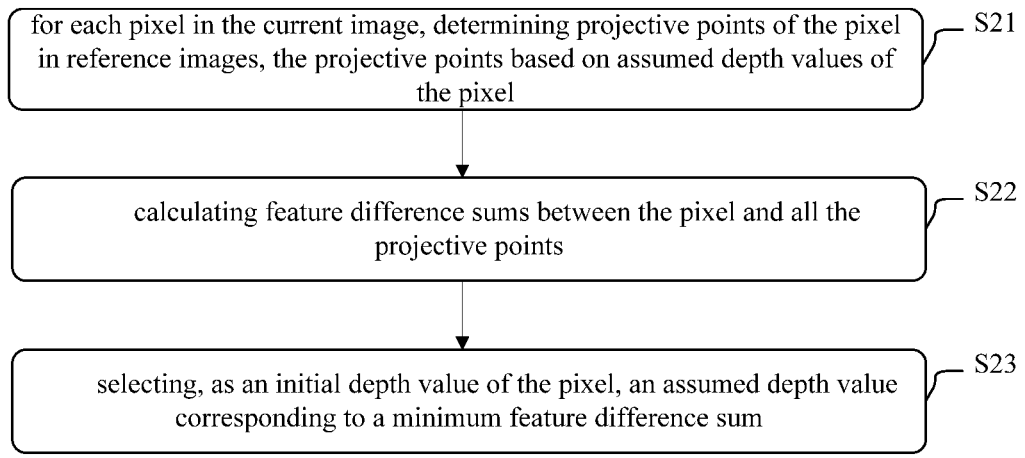
FIG. 2 shows an exemplary method of acquiring an initial depth value.

As shown in FIG. 2, a method of obtaining an initial depth value of each pixel in the current image comprises: taking images among the plurality of images other than the current image as reference images, and for each pixel in the current image, determining projective points of the pixel in the reference images, the projective points based on assumed depth values of the pixel (step S21); calculating feature difference sums between the pixel and all the projective points (step S22); selecting, as an initial depth value of the pixel, an assumed depth value corresponding to a minimum feature difference sum (step S23).

It is assumed that there is a total of M calibrated images, one of which is the current image and remaining M−1 ones of which are the reference images, where M is a positive integer greater than one.

A depth range is limited, so the depth range can be uniformly or non-uniformly segmented (sampled) into N discrete depth values, as a numerical range of the depth values.

For each pixel in the current image, it is assumed that the pixel has each of the N discrete depth values, as assumed depth values.

In step S21, for each assumed depth value, projective points of the pixel in the reference images can be determined. Since all the above M images are calibrated images, an internal parameter and an external parameter of a video camera are known so that the projective points can be determined according to the depth values. The internal parameter of the video camera refers to a parameter of the video camera per se, and the external parameter of the video camera relates to an orientation, such as a rotation, a translation and so on, of the video camera.

For example, for one pixel in one current image among the M images, N assumed depth values can be obtained, and for each assumed depth value, M−1 projective points in M−1 reference images corresponding to the pixel can be obtained. The N assumed depth values correspond to N groups (each group including M−1 projective points) of projective points.

In step S22, feature difference sums between the pixel and a group of M−1 projective points obtained for one of the N assumed depth values are calculated. N feature difference sums can be obtained for the N assumed depth values.

A feature for example may be a color, a brightness component and the like. A feature difference may be represented by an absolute value of a difference between features, a square of a difference between features, and the like. Each pixel corresponds to M−1 feature differences, and a sum of the M−1 feature differences is taken. Or, a feature difference sum is equal to a root of a quadratic sum of a difference between features.

In step S23, an assumed depth value corresponding to a minimum feature difference sum among the N feature difference sums corresponding to the N assumed depth values is selected as an initial depth value of the pixel.

Through deduction by analogy, an initial depth value of each pixel in the current image can be obtained.

Through deduction by analogy, a depth map of each image can be obtained.

In step S2, the current image is divided into a plurality of superpixels.

A superpixel is a small area comprising a series of neighboring pixels having similar features, and is a subset of all pixels of an entire image. Features which are similar include features such as color, brightness and so on which are similar. Superpixels mostly reserve effective information of further performing image segmentation, and generally will not destroy boundary information of objects in images. Thus, connected components on the current image in which pixels have similar features can be determined as superpixels. Any appropriate image segmentation algorithm can be used herein.

Most of three-dimensional scenarios can be segmented into a plurality of small plane surfaces. The current image is divided into a plurality of superpixels, each of which is possibly on only one plane surface. Thus, each superpixel corresponds to one group of plane parameters. The present disclosure is intended to perform correction on initial depth values on superpixel level, so as to obtain accurate depth values. Thus, all the constraint conditions described in detail below are based on superpixels. There is the following relation between plane parameters of superpixels and depth values of pixels:

$$d = \frac{1}{\alpha^T * (K^{-1} * \dot{x})} \quad (1)$$

where d is a depth of a pixel on a superpixel, $\alpha^T$ is a plane parameter of a superpixel, $K^{-1}$ represents the internal parameter of the video camera, $\dot{x}$ represents coordinates of a pixel.

The internal parameter of the video camera is known, so for each pixel on each superpixel, a depth of the pixel can be represented by the plane parameter of the superpixel. Also, the initial depth value of the pixel is known, so under a predetermined constraint condition, plane parameters of superpixels satisfying the predetermined constraint condition can be obtained by solving an optimization problem.

In step S3, plane parameters of the plurality of superpixels are obtained according to a predetermined constraint condition based on the initial depth values.

In the present disclosure, four constraint conditions are proposed. One, two, three or four of the four constraint conditions may be utilized to construct a cost function. The optimal plane parameters of superpixels are calculated by minimizing a cost.

A first constraint condition is a co-connection constraint. The co-connection constraint is related to a difference between depth values of adjacent points on neighboring superpixels that do not occlude each other.

The neighboring superpixels are possibly connected to each other, unless they have occlusions. Thus, pixels, namely adjacent points, at the boundary of the neighboring superpixels shall have approximate depth values, except the case of occlusions. Thus, the co-connection constraint requires the difference between the depth values of the adjacent points on the neighboring superpixels that do not occlude each other to be minimized.

Initial depth values of pixels may be utilized to judge whether neighboring superpixels have occlusions. Specifically, an average initial depth value of pixels on each superpixel of two neighboring superpixels is calculated first. Then, an absolute value of a difference between the average initial depth values of the two neighboring superpixels is calculated. If the absolute value is less than a predetermined threshold, the two neighboring superpixels are judged as not occluding each other. This satisfies the assumption that depth values of the neighboring superpixels are approximate if they do not have occlusions. On the contrary, if the absolute value is greater than or equal to a predetermined threshold, the two neighboring superpixels are judged as occluding each other.

The adjacent points may be selected as two or more pixels at the boundary of two neighboring superpixels, and the number of the adjacent points may be specified by those skilled in the art according to actual requirements.

Upon determination of the adjacent points, depth values of the adjacent points can be represented by the plane parameters of the superpixels using the above formula (1), thereby further calculating a depth difference between the adjacent points, so as to construct a cost item in regard to the co-connection constraint in the cost function.

A second constraint condition is an image consistency constraint. The image consistency constraint is related to a feature difference between a selected point on each superpixel and its projective point on a reference image.

Projective points of a same three-dimensional point on different images in a three-dimensional scenario shall have high consistency or similarity in terms of features. The features include color, brightness and the like. Thus, the second constraint condition requires differences between features of several points (pixels) on each superpixel on the current image and features of projective points of these points on a reference image to be minimized.

According to a depth value of a pixel on the current image as well as the internal parameter and the external parameter of the video camera, a projective point on a reference image corresponding to the pixel can be determined. Thus, a depth value of a selected point can be represented by the plane parameters of the superpixels using the above formula (1), thereby further determining a corresponding projective point, so as to calculate a feature difference between the selected point and the corresponding projective point, so as to construct a cost item in regard to the image consistency constraint in the cost function.

The number of the selected points may be specified by those skilled in the art according to actual requirements. The selected points may be selected randomly, and may also be selected according to a predetermined rule, such as a rule that the distribution of the selected points are distributed uniformly on the superpixels as far as possible, and the like.

A third constraint condition is a geometric consistency constraint. The geometric consistency constraint is related to a position difference between a selected point on each superpixel and its second projective point where its first projective point on a reference image is again projected back on the current image.

After a pixel on a superpixel is projected onto a reference image, a projective point (a second projective point) obtained from a projective point (a first projective point) on the reference image projected again onto the current image shall coincide with an original position of the pixel.

According to a depth value of a pixel on the current image as well as the internal parameter and the external parameter of the video camera, a first projective point on a reference image corresponding to the pixel can be determined. According to a depth value of the first projective point on the reference image as well as the internal parameter and the external parameter of the video camera, a second projective point on the current image which corresponds to the first projective point can be determined. Thus, a depth value of a selected point and a depth of the first projective point can be represented by the plane parameters of the superpixels using the above formula (1), thereby further calculating a position difference between the selected point and the second projective point, so as to construct a cost item in regard to the geometric consistency constraint in the cost function.

The position difference between the selected point and the second projective point is represented for example by a distance between the two points.

The number of the selected points may be specified by those skilled in the art according to actual requirements. The selected points may be selected randomly, and may also be selected according to a predetermined rule, such as a rule that the distribution of the selected points are distributed uniformly on the superpixels as far as possible, and the like.

A fourth constraint is a co-plane constraint. The co-plane constraint is related to a depth difference between selected points of neighboring superpixels whose features are similar.

The neighboring super pixels are possibly on one plane if they have similar features. The features include color, brightness and the like. The co-plane constraint condition requires the depth difference between the selected points of the neighboring superpixels whose features are similar to be minimized.

The number of the selected points may be specified by those skilled in the art according to actual requirements. The selected points may be selected randomly, and may also be selected according to a predetermined rule, such as a rule that the distribution of the selected points are distributed uniformly on the superpixels as far as possible, and the like. One example of the selected points is one or more pixels at a central position of a superpixel.

Upon determination of the selected points, depth values of the selected points can be represented by the plane parameters of the superpixels using the above formula (1), thereby further calculating a depth difference, so as to construct a cost item in regard to the co-plane constraint in the cost function.

For example, superpixels $S_i$ and $S_j$ are neighboring superpixels having similar features. The center pixel of the superpixel $S_i$ is $C_i$, and the center pixel of the superpixel $S_j$ is $C_j$. A depth difference may be an absolute value of a difference between a depth value of the pixel $C_i$ which is represented by a plane parameter of the superpixel $S_i$ and a depth value of the pixel $C_j$ which is represented by a plane parameter of the superpixel $S_j$, may also be an absolute value of a difference between a depth value of the pixel $C_i$ which is represented by a plane parameter of the superpixel $S_i$ and a depth value of the pixel $C_i$ which is represented by a plane parameter of the superpixel $S_j$, and may also be an absolute value of a difference between a depth value of the pixel $C_j$ which is represented by a plane parameter of the superpixel $S_i$ and a depth value of the pixel $C_j$ which is represented by a plane parameter of the superpixel $S_j$.

A cost function based on a cost item of the plane parameters of the superpixels is constructed according to the above one or more constraint conditions. With the aid of the initial values obtained in step S1, the optimal value of the plane parameters of the superpixels can be calculated.

In step S4, a depth value of each pixel in the superpixels is generated based on the plane parameters of the superpixels.

As can be seen from the above formula (1), a depth of a pixel on the superpixels and the plane parameters of the superpixels can be calculated from each other. Thus, upon obtainment of the plane parameters of all the superpixels of the current image, a depth value of each pixel on all the superpixels of the current image can be obtained.

By taking each image among a plurality of images in a same scenario as a current image in turn, corresponding depth maps of the plurality of images can be calculated.

Accordingly, an accurate depth map can be generated by introducing the superpixels and the four constraint conditions.

A depth estimation apparatus of multi-view images according to an embodiment of the present disclosure will be described below with reference to FIG. 3.

Figure 3:
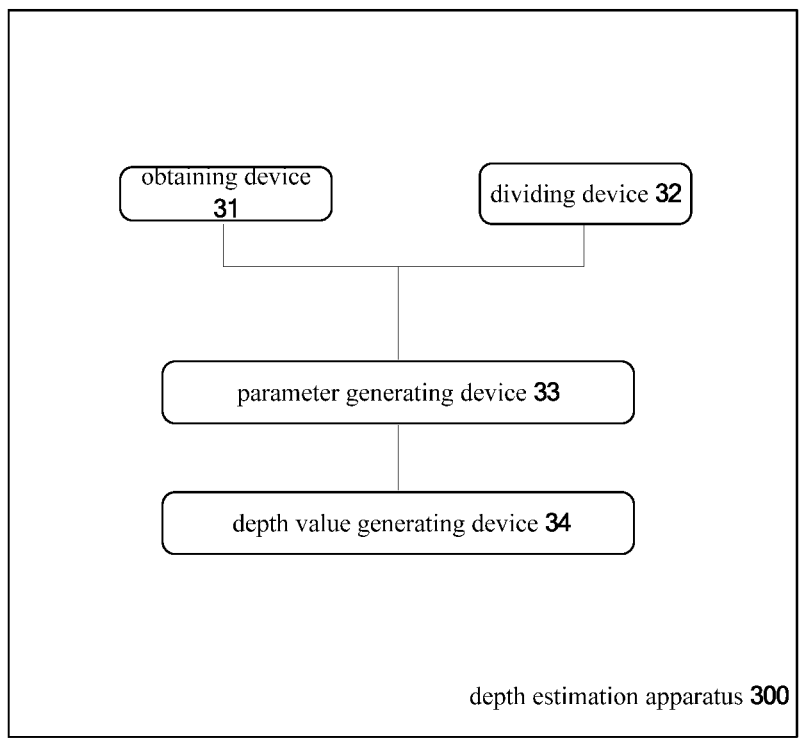
FIG. 3 shows a structural block diagram of a depth estimation apparatus of multi-view images according to an embodiment of the present disclosure.

FIG. 3 shows a structural block diagram of a depth estimation apparatus of multi-view images according to an embodiment of the present disclosure. As shown in FIG. 3, a depth estimation apparatus 300 according to the present disclosure performs operations by taking each image among a plurality of images in a same scenario as a current image, the depth estimation apparatus 300 comprising: an obtaining device 31 configured to: obtain an initial depth value of each pixel in the current image; a dividing device 32 configured to: divide the current image into a plurality of superpixels; a parameter generating device 33 configured to: obtain plane parameters of the plurality of superpixels according to a predetermined constraint condition based on the initial depth values; and a depth value generating device 34 configured to: generate a depth value of each pixel in the superpixels based on the plane parameters of the superpixels; wherein the predetermined constraint condition includes: a co-connection constraint, which is related to a difference between depth values of adjacent points on neighboring superpixels that do not occlude each other.

In one embodiment, the predetermined constraint condition further includes: an image consistency constraint, which is related to a feature difference between a selected point on each superpixel and its projective point on a reference image, the reference image being an image other than the current image among the plurality of images.

In one embodiment, the predetermined constraint condition further includes: a geometric consistency constraint, which is related to a position difference between a selected point on each superpixel and its second projective point where its first projective point on a reference image is again projected back on the current image, the reference image being an image other than the current image among the plurality of images.

In one embodiment, the predetermined constraint condition further includes: a co-plane constraint, which is related to a depth difference between selected points of neighboring superpixels whose features are similar.

In one embodiment, if an absolute value of a difference between average initial depth values of pixels on two neighboring superpixels is less than a predetermined threshold, the two neighboring superpixels are judged as not occluding each other.

In one embodiment, if an absolute value of a difference between average initial depth values of pixels on two neighboring superpixels is greater than or equal to a predetermined threshold, the two neighboring superpixels are judged as occluding each other.

In one embodiment, the adjacent points on the neighboring superpixels include pixels at neighboring edges of the neighboring superpixels.

In one embodiment, the obtaining device 31 is further configured to: for each pixel in the current image, determine projective points of the pixel in reference images as images among the plurality of images other than the current image, the projective points based on assumed depth values of the pixel; calculate feature difference sums between the pixel and all the projective points; select, as an initial depth value of the pixel, an assumed depth value corresponding to a minimum feature difference sum.

In one embodiment, the dividing device 32 is further configured to: determine, as superpixels, connected components on the current image in which pixels have similar features.

Since the processing in the respective devices and units included in the depth estimation apparatus 300 according to the present disclosure are respectively similar to the processing in the respective steps included in the depth estimation method as described above, detailed descriptions of these devices and units are omitted herein for the sake of conciseness.

In addition, it shall also be noted herein that the respective constituent devices and units in the above apparatus can be configured by software, firmware, hardwire or a combination thereof. Specific means or manners that can be used for the configuration will not be stated repeatedly herein since they are well-known to those skilled in the art. In case of implementation by software or firmware, programs constituting the software are installed from a storage medium or a network to a computer (e.g. the universal computer 400 as shown in FIG. 4) having a dedicated hardware structure; the computer, when installed with various programs, can implement various functions and the like.

Figure 4:
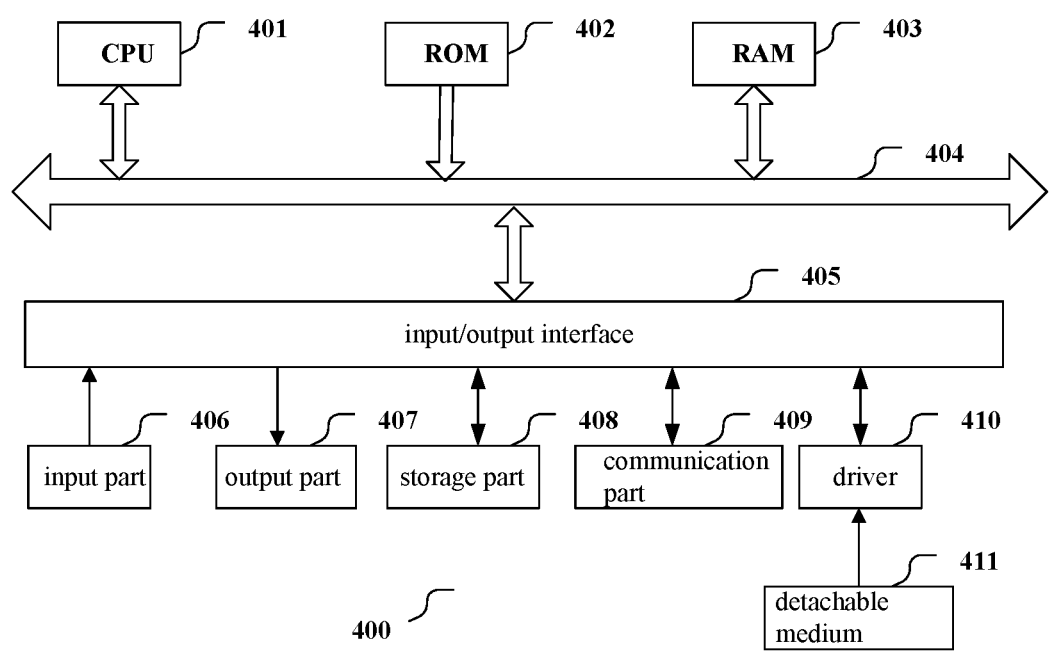
FIG. 4 shows a schematic block diagram of a computer that can be used for implementing the method and apparatus according to the embodiments of the present disclosure.

FIG. 4 shows a schematic block diagram of a computer that can be used for implementing the method and apparatus according to the embodiments of the present disclosure.

In FIG. 4, a central processing unit (CPU) 401 executes various processing according to a program stored in a read-only memory (ROM) 402 or a program loaded from a storage part 408 to a random access memory (RAM) 403. In the RAM 403, data needed when the CPU 401 executes various processing and the like is also stored according to requirements. The CPU 401, the ROM 402 and the RAM 403 are connected to each other via a bus 404. An input/output interface 405 is also connected to the bus 404.

The following components are connected to the input/output interface 405: an input part 406 (including a keyboard, a mouse and the like); an output part 407 (including a display, such as a Cathode Ray Tube (CRT), a Liquid Crystal Display (LCD) and the like, as well as a loudspeaker and the like); the storage part 408 (including a hard disc and the like); and a communication part 409 (including a network interface card such as an LAN card, a modem and so on). The communication part 409 performs communication processing via a network such as the Internet. According to requirements, a driver 410 may also be connected to the input/output interface 405. A detachable medium 411 such as a magnetic disc, an optical disc, a magnetic optical disc, a semiconductor memory and the like may be installed on the driver 410 according to requirements, such that a computer program read therefrom is installed in the storage part 408 according to requirements.

In the case of carrying out the foregoing series of processing by software, programs constituting the software are installed from a network such as the Internet or a storage medium such as the detachable medium 411.

Those skilled in the art should appreciate that such a storage medium is not limited to the detachable medium 411 storing therein a program and distributed separately from the apparatus to provide the program to a user as shown in FIG. 4. Examples of the detachable medium 411 include a magnetic disc (including floppy disc (registered trademark)), a compact disc (including compact disc read-only memory (CD-ROM) and digital versatile disc (DVD), a magneto optical disc (including mini disc (MD)(registered trademark)), and a semiconductor memory. Or, the storage medium may be the ROM 402, hard discs included in the storage part 408 and the like in which programs are stored, and are distributed concurrently with the apparatus including them to users.

The present disclosure further proposes a program product storing machine-readable instruction code. When read and executed by a machine, the instruction code can implement the foregoing method according to the embodiments of the present disclosure.

Correspondingly, a storage medium for carrying the program product storing therein the machine-readable instruction code is also included in the disclosure of the present disclosure. The storage medium includes but is not limited to a floppy disc, an optical disc, a magnetic optical disc, a memory card, a memory stick and the like.

In the forgoing descriptions of the specific embodiments of the present disclosure, features described and/or shown for one embodiment may be used in one or more other embodiments in an identical or similar way, be combined with features in other embodiments, or substitute features in other embodiments.

It should be emphasized that when used in the text, the term "comprise/include" refers to existence of features, elements, steps or components, but does not exclude existence or addition of one or more other features, elements, steps or components.

In addition, the method according to the present disclosure is not limited to be performed in the temporal order described in the specification, but may also be performed sequentially in other temporal orders, in parallel or independently. Thus, the order of performing the method as described in the specification does not constitute a limitation to the technical scope of the present disclosure.

Although the present disclosure has been disclosed above by describing the specific embodiments of the present disclosure, it should be understood that all the embodiments and examples as described above are exemplary, but not limitative. Those skilled in the art could carry out various modifications, improvements or equivalents for the present disclosure within the spirit and scope of the appended claims. The modifications, improvements or equivalents shall also be regarded as being included in the scope of protection of the present disclosure.

What is claimed is:

1. A depth estimation method of multi-view images, comprising:
   using each image among a plurality of images in a same scenario as a current image to perform a processing of:
      obtaining an initial depth value of each pixel in the current image,
      dividing the current image into a plurality of superpixels,
      obtaining plane parameters of the plurality of superpixels according to a predetermined constraint condition based on initial depth value, and
      generating a superpixel depth value of each pixel in the superpixels based on the plane parameters of the superpixels,
   wherein the predetermined constraint condition includes:
      a co-connection constraint, which is related to a value difference between depth values of adjacent points on neighboring superpixels on which an absolute value of a difference between average initial depth values of pixels is less than a predetermined threshold, and
      a geometric consistency constraint, which is related to a position difference between a selected point on each superpixel and a corresponding second projective point where the corresponding first projective point on the reference image is again projected back on the current image, the reference image being an image other than the current image among the plurality of images.

2. The depth estimation method according to claim 1, wherein the predetermined constraint condition further includes an image consistency constraint, which is related to a feature difference between a selected point on each superpixel and a corresponding first projective point on a reference image, the reference image being an image other than the current image among the plurality of images.

3. The depth estimation method according to claim 1, wherein the predetermined constraint condition further includes a co-plane constraint, which is related to a depth difference between selected points of neighboring superpixels having features that are similar.

4. The depth estimation method according to claim 1, wherein adjacent points on the neighboring superpixels include pixels at neighboring edges of the neighboring superpixels.

5. The depth estimation method according to claim 1, wherein obtaining an initial depth value of each pixel in the current image comprises:
for each pixel in the current image,
determining projective points of the pixel in reference images as images among the plurality of images other than the current image, the projective points based on assumed depth values of the pixel;
calculating feature difference sums between the pixel and all the projective points;
selecting, as an initial depth value of the pixel, an assumed depth value corresponding to a minimum feature difference sum.

6. The depth estimation method according to claim 1, wherein dividing the current image into a plurality of superpixels comprises:
determining, as superpixels, connected components on the current image in which pixels have similar features.

7. A depth estimation apparatus of multi-view images, which performs operations by using each image among a plurality of images in a same scenario as a current image, the depth estimation apparatus comprising:
an obtaining device configured to obtain an initial depth value of each pixel in the current image;
a dividing device configured to divide the current image into a plurality of superpixels;
a parameter generating device configured to obtain plane parameters of the plurality of superpixels according to a predetermined constraint condition based on initial depth values; and
a depth value generating device configured to generate a depth value of each pixel in the plurality of superpixels based on the plane parameters of the plurality of superpixels;
wherein the predetermined constraint condition includes:
a co-connection constraint, which is related to a difference between depth values of adjacent points on neighboring superpixels on which an absolute value of a difference between average initial depth values of pixels is less than a predetermined threshold; and
a geometric consistency constraint, which is related to a position difference between a selected point on each superpixel and a corresponding second projective point where the corresponding first projective point on the reference image is again projected back on the current image, the reference image being an image other than the current image among the plurality of images.

8. The depth estimation apparatus according to claim 7, wherein the predetermined constraint condition further includes an image consistency constraint, which is related to a feature difference between a selected point on each superpixel and a corresponding first projective point on a reference image, the reference image being an image other than the current image among the plurality of images.

9. The depth estimation apparatus according to claim 7, wherein the predetermined constraint condition further includes a co-plane constraint, which is related to a depth difference between selected points of neighboring superpixels having features that are similar.

10. The depth estimation apparatus according to claim 7, wherein the adjacent points on the neighboring superpixels include pixels at neighboring edges of the neighboring superpixels.

11. The depth estimation apparatus according to claim 7, wherein the obtaining device is further configured to:
for each pixel in the current image,
determine projective points of the pixel in reference images as images among the plurality of images other than the current image, the projective points based on assumed depth values of the pixel;
calculate feature difference sums between the pixel and all the projective points;
select, as an initial depth value of the pixel, an assumed depth value corresponding to a minimum feature difference sum.

12. The depth estimation apparatus according to claim 7, wherein the dividing device is further configured to:
determine, as superpixels, connected components on the current image in which pixels have similar features.

* * * * *